(12) United States Patent
Guan et al.

(10) Patent No.: US 12,396,382 B2
(45) Date of Patent: Aug. 26, 2025

(54) **METHOD FOR BREAKING DORMANCY OF *THESIUM CHINENSE* TURCZ. SEEDS**

(71) Applicant: JIUHUA HUAYUAN PHARMACEUTICAL CO., LTD., Anhui (CN)

(72) Inventors: Yueqin Guan, Anhui (CN); Weibing Zheng, Anhui (CN); Chengmin Yang, Anhui (CN); Qisheng Yao, Anhui (CN); Zheng Zhang, Anhui (CN)

(73) Assignee: JIUHUA HUAYUAN PHARMACEUTICAL CO., LTD., Chuzhou (CN)

( * ) Notice: Subject to any disclaimer, the term of this patent is extended or adjusted under 35 U.S.C. 154(b) by 38 days.

(21) Appl. No.: 18/007,895

(22) PCT Filed: Apr. 20, 2022

(86) PCT No.: PCT/CN2022/087843
§ 371 (c)(1),
(2) Date: Jun. 4, 2024

(87) PCT Pub. No.: WO2022/267655
PCT Pub. Date: Dec. 29, 2022

(65) Prior Publication Data
US 2024/0306531 A1    Sep. 19, 2024

(30) Foreign Application Priority Data
Jun. 23, 2021 (CN) .......................... 202110699418.6

(51) Int. Cl.
*A01C 1/02* (2006.01)
(52) U.S. Cl.
CPC ..................................... *A01C 1/02* (2013.01)
(58) Field of Classification Search
CPC ....................................................... A01C 1/02
See application file for complete search history.

(56) References Cited

U.S. PATENT DOCUMENTS

| 8,181,389 B1 * | 5/2012 | Carlson | A01C 1/02 |
| | | | 47/57.6 |
| 2005/0150161 A1 * | 7/2005 | Hartle | A01C 1/02 |
| | | | 47/58.1 SE |

(Continued)

FOREIGN PATENT DOCUMENTS

| CN | 102057777 A | 5/2011 |
| CN | 102057777 B | 7/2012 |

(Continued)

OTHER PUBLICATIONS

European Search Report for European Application No. EP 22803156.3, Completed by the European Patent Office, Dated Sep. 6, 2024, 5 pages.

(Continued)

*Primary Examiner* — Joshua D Huson
*Assistant Examiner* — Edgar Reyes
(74) *Attorney, Agent, or Firm* — Brooks Kushman P.C.

(57) ABSTRACT

A method for breaking dormancy of *Thesium chinense* Turcz. seeds, which includes: immersing collected seeds of *Thesium chinense* Turcz. in water, selecting seeds that sink in the water followed by air-drying, and storing at 2-4° C. to obtain to-be-used seeds; immersing the to-be-used seeds in a gibberellin solution, taking out the seeds and mixing with river sand under −4-2° C. for a first stratification treatment; rinsing off the river sand, removing green skins and stalks of the seeds after the first stratification treatment, keeping the seeds moist and placing the seeds under 2-4° C. for a second stratification treatment to obtain ruptured seeds; and using the ruptured seeds in a three-slit stage as a germination material, and culturing the ruptured seeds in a three-slit stage in a dark environment at 17-22° C. for seed germination. The method can significantly improve the germination rate of *Thesium chinense* Turcz. seeds.

20 Claims, 2 Drawing Sheets

(56) References Cited

U.S. PATENT DOCUMENTS

| | | | | |
|---|---|---|---|---|
| 2007/0000169 A1* | 1/2007 | Hartle | ...................... | A01C 1/02 47/58.1 SE |
| 2008/0152735 A1 | 6/2008 | Chang et al. | | |
| 2010/0126065 A1* | 5/2010 | Nishimura | ............... | A01C 1/02 47/58.1 SE |

FOREIGN PATENT DOCUMENTS

| | | |
|---|---|---|
| CN | 104541821 A | 4/2015 |
| CN | 107548601 A | 1/2018 |
| CN | 108513757 A | 9/2018 |
| CN | 109511313 A | 3/2019 |
| CN | 110100526 A | 8/2019 |
| CN | 110115131 A | 8/2019 |
| CN | 110755386 A | 2/2020 |
| CN | 111010920 A | 4/2020 |
| CN | 109463064 B | 12/2020 |
| CN | 110100526 B | 9/2021 |
| CN | 113491223 A | 10/2021 |
| TW | 200826954 A | 7/2008 |

OTHER PUBLICATIONS

National Intellectual Property Administration, PRC, Office Action for Chinese Patent Application No. 202110699418.6 dated Nov. 22, 2021.

Zhang, Chengcal et al., Study on Breaking Dormancy of *Thesium chinense* Turcz Seeds and Optimization of Facility Cultivation Conditions, College of Horticulture, Nanjing Agricultural University, Nanjing 210095, Jiangsu, China, Feb. 2020. 7 pages.

Luo Fulai, et al., Study on Seeds Dormancy Release and Physiological Change of Thesium Chinense, Institute of Chinese Medicinal Materials, Nanjing Agricultural University, Nanjing 210095, Jiangsu, China, Mar. 2012, 4 pages.

Parveen, Zahida et al., Antiinflammatory and analgesic activities of Thesium chinense Turcz extracts and its major flavonoids, kaempferol and kaempferol-3-O-glucoside, School of Life Sciences and Technology, Beijing Institute of Technology, Beijing 100081, P.R. China, Apr. 16, 2007, 5 pages.

* cited by examiner

METHOD FOR BREAKING DORMANCY OF *THESIUM CHINENSE* TURCZ. SEEDS

CROSS-REFERENCE TO RELATED APPLICATION

This application is a U.S. national phase of International Patent Application No. PCT/CN2022/087843 with an international filing date of Apr. 20, 2022, designating the U.S., and further claims the benefit of Chinese patent application No. 202110699418.6, titled "Method for Breaking Dormancy of *Thesium chinense* Turcz. Seeds" filed on Jun. 23, 2021, the contents of which are incorporated herein by reference.

TECHNICAL FIELD

The present application relates to the field of planting of *Thesium chinense* Turcz., and in particular, to a method for breaking dormancy of *Thesium chinense* Turcz. seeds.

BACKGROUND

*Thesium chinense* Turcz. is a semi-parasitic plant of the family Santalaceae. Its dried whole plant is a commonly used Chinese herbal medicine, which has functions of adjusting physical conditions related to dehydration and kidney health, researches have shown that *Thesium chinense* Turcz. has significant anti-inflammatory, analgesic and broad-spectrum antibacterial effects, and is known as "plant antibiotics". The clinical application of *Thesium chinense* Turcz. preparations mainly include granules, tablets, capsules, and the like, for reducing inflammation, relieving cough and resolving phlegm, also for treatment of acute and chronic pharyngitis, bronchitis, rhinitis, cold and fever, pneumonia and etc.

the natural reserves and market supply of *Thesium chinense* Turcz. have been declining sharply in recent years, due to excessive excavation, environmental damage, and the semi-parasitic characteristics of *Thesium chinense* Turcz., therefore *Thesium chinense* Turcz. becomes one of the herbs whose price shows the most significant increase due to the imbalance of supply and demand. It is therefore highly desirable to carry out artificial intervention or artificial cultivation of *Thesium chinense* Turcz. *Thesium chinense* Turcz. predominantly is propagated from seeds, and there is a long deep dormancy period after the seeds mature. Under natural conditions, the dormancy period ranges from 11 to 36 months. The seeds become mature between April and June, while germinate between next March to April, with low germination percentage and uneven germination. Seed dormancy is the result of a variety of germination-repressing factors, which can be removed by changing environmental factors (e.g., post-ripening, variable temperature treatments) and gibberellins (GAs). Phytohormone treatment and alternating temperature stratification have been developed in the art to break the dormancy of the seeds of Pennywort, however, the overall efficiency as well as the germination rate are low, with poor maneuverability.

Therefore, improvements are needed for the related technology.

Technical Problem

Embodiments of the present application provides a method for breaking dormancy of *Thesium chinense* Turcz. seeds.

Technical Proposals

The present application provides the following technical proposals.

A method for breaking dormancy of *Thesium chinense* Turcz. seeds, including:
  immersing collected seeds of *Thesium chinense* Turcz. in water, selecting seeds that sink in the water followed by air-drying, and storing at 2° C. to 4° C. to obtain to-be-used seeds;
  immersing the to-be-used seeds in a gibberellin solution, taking out the seeds and mixing with river sand under −4° C. to −2° C. for a first stratification treatment;
  rinsing off the river sand, removing green skins and stalks of the seeds after the first stratification treatment, keeping the seeds moist and placing the seeds under 2° C. to 4° C. for a second stratification treatment to obtain ruptured seeds; and
  using the ruptured seeds in a three-slit stage as a germination material, and culturing the ruptured seeds in a three-slit stage in a dark environment at 17° C. to 22° C. for seed germination.

In some embodiments, the collected seeds are immersed in the water for 10-14 hours.

In some embodiments, stirring, during water immersion, for 4-6 times.

In some embodiments, a concentration of the gibberellin solution is 750-1000 mgL$^{-1}$.

In some embodiments, the gibberellin is GA$_3$.

In some embodiments, the to-be-used seeds are immersed in the gibberellin solution for 22-26 hours.

In some embodiments, the to-be-used seeds are immersed in the gibberellin solution for 24 hours.

In some embodiments, in the step of mixing with river sand under −4° C. to −2° C. for a first stratification treatment, a mass ratio of the seeds to the river sand is 1:1, and a duration of the first stratification treatment is 58-62 days.

In some embodiments, a water content of the river sand is such that the river sand forms a cluster under pressure and scatters when no force being applied.

In some embodiments, in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

In some embodiments, in the step of placing the seeds under 2° C. to 4° C. for a second stratification treatment to obtain ruptured seeds, the ruptured seeds are rinsed with water every 7 days throughout the second stratification treatment of a total duration of 120 days.

In some embodiments, the step of keeping the seeds moist includes placing the seeds on a mesh after removing the green skins and the stalks, and covering with a plastic film to keep the seeds moist.

Advantageous Effects

In the method for breaking dormancy of *Thesium chinense* Turcz. seeds provided by embodiments of the present application, *Thesium chinense* Turcz. seeds are collected and immersed in water followed by air-drying, and the to-be-used seeds are stored under 2° C. to 4° C., the to-be-used seeds are then immersed in a gibberellin solution for a pretreatment, and the first stratification treatment is carried out at −4° C. to −2° C., which is followed by a second stratification treatment at 2° C. to 4° C., thus ruptured seeds in the three-slit stage are selected as a germination material, and are cultured to break the dormancy. The method can significantly improve the germination rate of the *Thesium chinense* Turcz. seeds, shorten the dormancy time from 11 to 36 months under natural conditions to 150 to 180 days, with the germination rate as high as 97.50%, thus exhibiting a promising prospect of application.

BRIEF DESCRIPTION OF THE DRAWINGS

In order to more clearly illustrate the technical proposals in embodiments of the present application, accompanying drawings that are used in the description of the embodiments or exemplary technologies are briefly introduced hereinbelow. It is understood that the drawings in the following description are merely some embodiments of the present application. For those skilled in the art, other drawings can also be obtained according to these drawings without any creative effort.

DETAILED DESCRIPTION OF THE EMBODIMENTS

Figure 1:
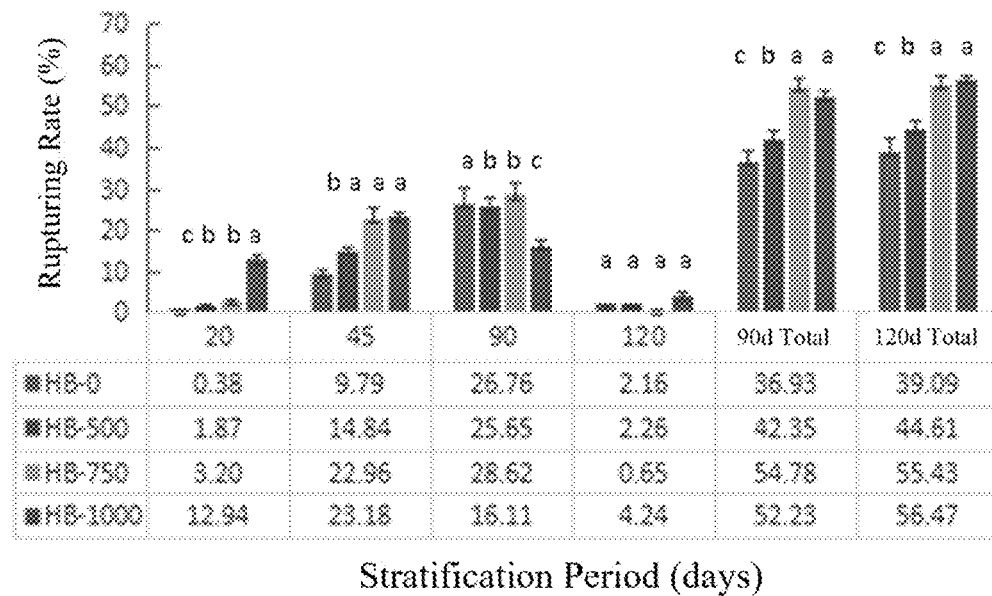
FIG. 1 is a bar chart showing the rupturing rate of *T. chinense* Turcz. Seeds from Hubei after the second stratification treatment according to an embodiment of the present application.

In order to make the purpose, technical proposals, and advantages of the present application more clearly understood, the present application will be described in further detail hereinbelow with reference to the accompanying drawings and embodiments. It should be understood that the specific embodiments described herein are merely used to explain the present application, but not to limit the present application.

It should be understood that, in various embodiments of the present application, the order of the sequence numbers of the above-mentioned processes does not represent the order of execution, some or all of the steps may be executed in parallel or sequentially, and the order of execution of each process should be based on its functions and It is determined by the internal logic, therefore should not be constituted as any limitation on the implementation process of the embodiments of the present application.

The terms used in the embodiments of the present application are merely for the purpose of describing detailed embodiments, and are not intended to limit the present application. As used in the embodiments of this application and the appended claims, the singular forms "a," "said", and "the" are intended to include their plural forms as well, unless the context clearly dictates otherwise.

The weight of the relevant components mentioned in the description of the embodiments of the present application not only refers to the specific content of each component, but also represents the proportional relationship between the weights of the components. Content of the ingredients obtained by either scaling up or down is within the scope of disclosure of the embodiments of the present application.

Specifically, the mass described in the embodiments of the present application may be in the mass units, such as µg, mg, g, kg, and the like, that are known in the field of chemical engineering.

The terms "first" and "second" are merely used for descriptive purposes to distinguish objects such as substances from each other, and cannot be understood as indicating or implying relative importance or implying the number of indicated technical features. For example, without departing from the scope of the embodiments of the present application, "the first" may also be referred to as "the second", and similarly, "the second" may also be referred to as "the first". Thus, a feature defined as "first" or "second" may expressly or implicitly include one or more of the features.

In order to more clearly understand the germination of *T. chinense* Turcz. seeds, in the present application, the time period during which seed germination and coat rupture happen after the stratified treatment of the seeds of *T. chinense* Turcz. is divided into four stages. The first stage is the imbibition stage, in which the size of the *T. chinense* Turcz. seeds gradually increases after the stratification treatment. The second stage is the germination stage, and a period in which a crack appears from the end of the radicle after the seeds swell, is called the single-slit stage, which is followed by a three-slit stage during which two cracks further appear from the radicle end, and the testa splits into three parts. The third stage is the radicle elongation stage, in which part of the testa falls off while the radicle grows and the seed expands. The fourth stage is the seedling stage, a complete seedling is developed as the cotyledons extend.

The present application provides a method for breaking dormancy of *Thesium chinense* Turcz. seeds, which includes steps S01-S04:

In step S01: *Thesium chinense* Turcz. seeds are collected and immersed in water, the seeds that sink in the water are picked out and air-dried, and to-be-used seeds are stored under 2° C. to 4° C.;

In step S02: the to-be-used seeds are immersed in a gibberellin solution, and taken out and mixed with river sand under −4° C. to −2° C. for a first stratification treatment;

In step S03: the river sand is rinsed off, and green skins and stalks of the seeds are removed after the first stratification treatment, a moisture treatment is carried out on the seeds and the seeds are placed under 2° C. to 4° C. for a second stratification treatment to obtain ruptured seeds; and In step S04: the ruptured seeds having three slits on seed coats are used as a germination material, and are cultured in a dark environment at 17° C. to 22° C. for seed germination.

In order to solve deep dormancy and poor germination rate of *Thesium chinense* Turcz. seeds, in the method for breaking dormancy of *Thesium chinense* Turcz. seeds provided by embodiments of the present application, *Thesium chinense* Turcz. seeds are collected and immersed in water followed by air-drying, and the to-be-used seeds are stored under 2° C. to 4° C., the to-be-used seeds are then immersed in a gibberellin solution for a pretreatment, and the first stratification treatment is carried out at −4° C. to −2° C., which is followed by a second stratification treatment at 2° C. to 4° C., thus ruptured seeds having three slits on the seed coat are selected as a germination material, and are cultured to break the dormancy. The method can significantly improve the germination rate of the *Thesium chinense* Turcz. seeds, shorten the dormancy time from 11 to 36 months under natural conditions to 150 to 180 days, with the germination rate as high as 97.50%, thus exhibiting a promising prospect of application. The above method aids in the artificial planting of *Thesium chinense* Turcz.

In step S01, the *T. chinense* Turcz. seeds may be collected by tapping the dried plant of the *Thesium chinense* Turcz., collecting the fallen seeds, and removing the impurities by winnowing. The collected seeds are immersed in water for 10-14 hours, stirred for several times (for example, 4-6 times) to remove floating seeds, therefore, seeds having better plumpness can be obtained. The seeds that sink in the water are then collected after the water immersion, that is, seeds with better plumpness that sink to the bottom of water are collected.

In the above step S02, in the gibberellin solution immersion treatment of the seeds, the concentration of the gibberellin solution is 750-1000 mgL$^{-1}$. Gibberellin is $GA_3$, and this concentration of gibberellin ($GA_3$) illustrates better effect on the seeds. The above immersion treatment in gibberellin solution lasts 22-26 hours.

In an embodiment, the *T. chinense* Turcz. seeds are taken and mixed with river sand under −4° C. to −2° C. for the first stratification treatment; a mass ratio of the seeds to the river sand is 1:1, and a duration of the first stratification treatment is 58-62 days. Low-temperature stratification within the above temperature range is more effective. In the above first stratification treatment, the water content of the river sand is such that the river sand forms a cluster under pressure and scatters when no force being applied.

In the step S03 above, moisture treatment includes placing the seeds on a mesh after removing the green skins and the stalks, and covering with a plastic film to keep the seeds moist, so as to achieve a better moisturizing effect.

In an embodiment, the seeds are placed under 2° C. to 4° C. for a second stratification treatment after the moisture treatment to obtain ruptured seeds; in this step, the ruptured seeds are rinsed with water every 6-8 days throughout the second stratification treatment of a total duration of 115-125 days to obtain the ruptured seeds with three slits on their seed coats. More preferably, the ruptured seeds are rinsed with water every 7 days throughout the second stratification treatment of a total duration of 120 days.

In an embodiment of the present application, $GA_3$ of 750 mgL$^{-1}$ is used to immerse the *T. chinense* Turcz. seeds from Shaanxi, and $GA_3$ of 1000 mgL$^{-1}$ is used to immerse the *T. chinense* Turcz. seeds from Hubei, for 24 hours. The first stratification treatment is carried out at −4° C. to −2° C. for 60 day using wet sand. The second stratification treatment is carried out at 2° C. to 4° C. for 120 days. As a result, a cumulative rupturing rate reaches 47.95% and 56.47% respectively. It is then determined that the ruptured seed with three slits are most suitable for germination, with a germination rate of 97.50%. Hence the problems of deep dormancy and low germination rate of *T. chinense* Turcz. seeds are overcome, thereby aiding in the artificial planting of *T. chinense* Turcz.

In a specific embodiment, the method for breaking dormancy of *Thesium chinense* Turcz. seeds includes:

A: seeds collection: immersing the collected *T. chinense* Turcz. seeds from Hubei and Shaanxi in water for 12 hours, stirring for several times, removing floating seeds, and air drying and storing in a cold storage at 4° C.;

B: pre-treatment on seeds: immersing the collected *T. chinense* Turcz. seeds from Hubei and Shaanxi respectively in $GA_3$ solution of 1000 mgL$^{-1}$ and 750 mgL$^{-1}$ for 24 hours, and draining the seeds;

C: low-temperature sand stratification: rinsing and drying river sand with uniform particles, and mixing evenly the seeds obtained from step B and the river sand at a ratio of 1:1, the water content of the river sand is such that the river sand forms a cluster under pressure and scatters when no force being applied, storing the mixture in a cold storage at −4° C. to −2° C. for 60 day; taking out the seeds from the storage, rinsing off the river sand, placing the rinsed seeds on a mesh, and covering with a plastic film and placing in a fridge at 4° C. for a second stratification treatment.

D: rupture of seeds: ruptured seeds are picked out by stages, and, until the 120th day of the second stratification treatment, the rupturing rate of *T. chinense* Turcz. seeds from Hubei and Shaanxi reach respectively 47.95% and 56.47%.

E: seeds germination: placing the rupture seeds with three slits on the seed coats in a dark environment at 17-22° C., a germination rate of 97.50% is reached.

In the method for breaking dormancy of *T. chinense* Turcz. seeds according to the embodiments of the present application, after freezing treatment of seeds mixed with river sand and low-temperature stratification treatment of net seeds, it effectively breaks the dormancy of *T. chinense* Turcz. seeds and promotes germination, and shortening the period of dormancy from 11 to 36 months under natural conditions to about 150 days. The rupturing rate of seeds reaches about 50%, which is significantly greater than 30% in previous researches. It is also determined that using *T. chinense* Turcz. seeds which developed to a three-slit stage enhances the germination rate to 97.50%, substantially higher than 68% in the previous researches. Furthermore, the method of the present application adopts low-temperature treatment on solely the seeds so as to reduce the size of the seeds, which aids in the observation of the development of the seeds so as to pick out the seeds which are adequate for seeding in time, thereby aiding in the artificial planting of *T. chinense* Turcz.

Example 1

I. Seeds Collection (1) the *T. chinense* Turcz. seeds may be collected by tapping the dried plant of the *Thesium chinense* Turcz., collecting the fallen seeds; (2) the impurities were removed by winnowing; (3) the collected seeds were immersed in water for 24 hours, stirred for several times to remove floating seeds, and the green skins and stalks of the seeds were removed, seeds sunk in the water were then collected and air-dried; where the above method was applied to the *T. chinense* Turcz. seeds from Shaanxi (SX) and Hubei (HB).

II. Pre-Treatment of Seeds

The above seeds from Shaanxi (SX) and Hubei (HB) were rinsed under running water at room temperature for 24 hours, drained to remove surface moisture, and then immersed respectively in gibberellin ($GA_3$) solutions with a concentration of 0, 500, 750, and 1000 mgL$^{-1}$ for 24 hours, represented by SX-0/HB-0, SX-500/HB-500, SX-750/HB-750, SX-1000/HB-1000, respectively.

III. Low-Temperature Stratification Treatment

River sand with uniform particles was rinsed and dried, the seeds obtained from the pre-treatment were mixed with the river sand at a mass ratio of 1:1, the water content of the river sand was such that the river sand formed a cluster under pressure and scatters when no force being applied, the mixture was stored in a cold storage at −4° C. to −2° C. for 60 day for a first stratification treatment; the seeds were taken out from the storage and the river sand was rinsed off, and then the rinsed seeds were placed on a mesh, covered with a plastic film and placed in a fridge at 4° C. for a second stratification treatment during which the seeds were rinsed every 7 days, throughout a total duration of 20, 45, 90, and 120 days, respectively.

IV. Seeds Germination a. Statistics of seed coats rupturing rate: 300 seeds were randomly selected after the second stratification treatment, rinsed with distilled water until clean, the number of seeds with ruptured coats was counted, where the rupturing rate=the number of ruptured seeds/total number of seeds×100%;

b. germination rate: the ruptured seeds having a single slit and three slits on the coats were placed on a petri dish of 9 cm covered with two layers of filter paper, distilled water was added, and a germination test was conducted under the dark condition at 17-22° C., germination rate=the number of germinated seeds/total number of seeds×100%.

Figure 2:
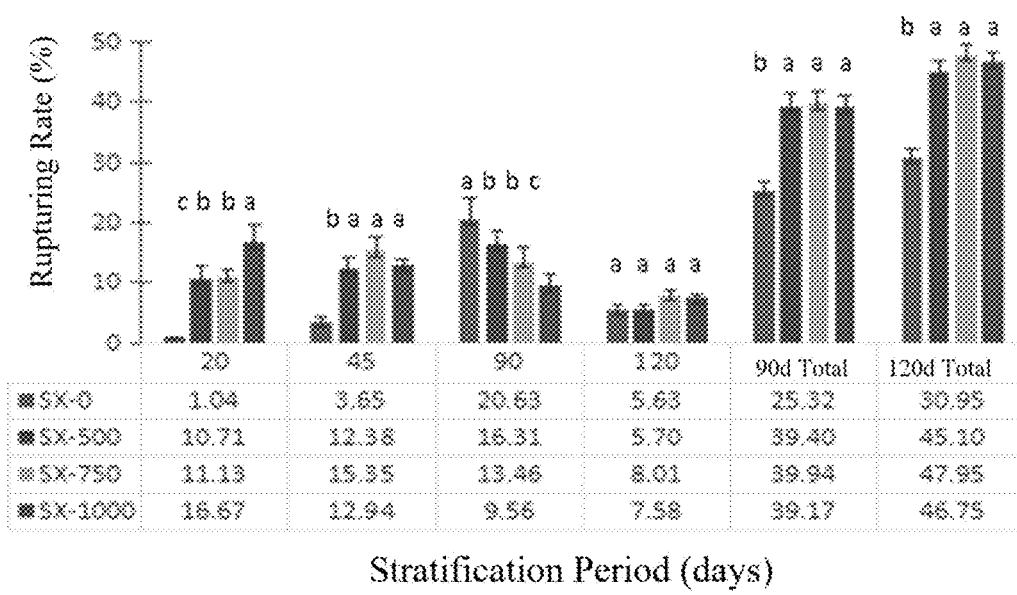
FIG. 2 is a bar chart showing the rupturing rate of *T. chinense* Turcz. Seeds from Shaanxi after the second stratification treatment according to an embodiment of the present application.

The results show that, as shown in FIGS. 1 and 2 (where the letters a, b, and c indicate differences, the different letters in the result data of the same day indicate a significant difference, P=0.05), the duration of second stratification treatment had a significant effect on the rupturing rate of the seeds, as the rupturing rate increases along with a longer duration of the second stratification treatment. The seeds treated with gibberellin ($GA_3$) is substantially higher than that of the control seeds without the treatment of gibberellin ($GA_3$), and the seeds from Hubei treated with $GA_3$ at 750 and 1000 $mgL^{-1}$ show a remarkably higher rupturing rate compared to other seeds, between which the seeds treated with $GA_3$ at 1000 $mgL^{-1}$ has the highest rupturing rate of 56.47%. The seeds from Shaanxi do not demonstrate substantial differences in response to the different concentrations of $GA_3$, amongst which the treatment with 1000 $mgL^{-1}$ $GA_3$ has the highest rupturing rate of 47.95%.

Figure 3:
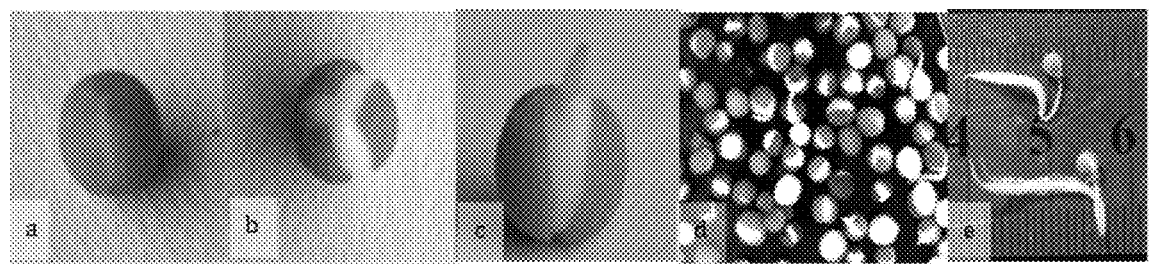
FIG. 3 is a schematic diagram of four stages of the germination of *T. chinense* Turcz. seeds.

After stratification treatments, the germination of *T. chinense* Turcz. seeds is divided into four stages. FIG. 3 shows the germination stages of the seeds from Hubei (HB). Taking the seeds from Hubei (HB) as an example, the first stage is the imbibition stage, in which the size of the *T. chinense* Turcz. seeds gradually increases after the stratification treatments. The second stage is the germination stage, and a period in which a crack appears from the end of the radicle after the seeds swell is called the single-slit stage (as in a of FIG. 3), which is followed by a three-slit stage during which two cracks further appear from the radicle end, and the seed coats split into three parts (as in b of FIG. 3). The third stage is the radicle elongation stage, in which part of the seed coats falls off while the radicle grows (as in c of FIG. 3), and the seed expands (as in d of FIG. 3). The fourth stage is the seedling stage, a complete seedling is developed as the cotyledons extend. Since there is no resistance of soil, the seed coats in the petri dish are not easy to fall off (as in e of FIG. 3).

Figure 4:
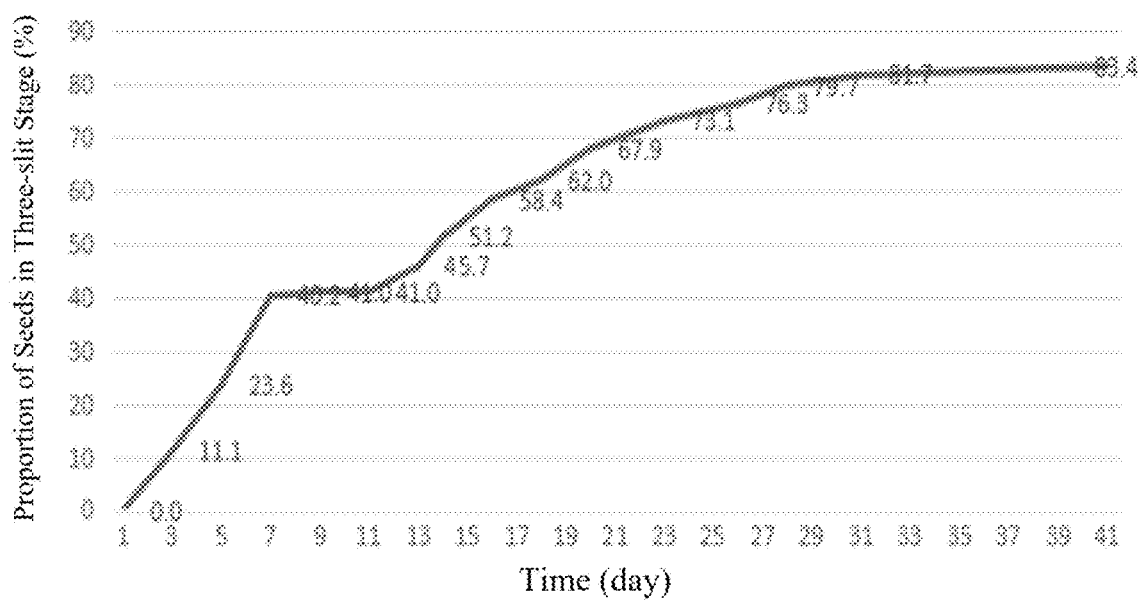
FIG. 4 is a diagram showing the trend of the cumulative number of seeds transformed from the single-slit stage to the three-slit stage in the stratification treatment according to the embodiment of the present application.

The development of *T. chinense* Turcz. seeds from the single-slit stage to the three-slit stage was carried out at a low temperature (4° C.), this progress is further divided into three phases. Taking the change in the cumulative number of the seeds from Hubei (HB) during development from the single-slit stage to the three-slit stage in the low-temperature stratification treatment, as shown in FIG. 4, as an example, the first phase is a rapid growth phase, from the 1st day to the $7^{th}$ day, in which the proportion of the seeds in the three-slit stage accumulatively reaches above 40%; the second phase is a plateau stage; from the $7^{th}$ day to the $13^{th}$ day, the seeds in the three-slit stage only increases by less than 5%, reaching 45.7%; the third phase is a slow growth phase, from the $15^{th}$ day to the $41^{st}$ day, in which the proportion of the seeds in the three-slit stage accumulatively reaches 83.7%, while 16.3% of the total seeds still remain in the single-slit stage.

A germination test was conducted on the seeds from Hubei (HB) in both single-slit and three-slit stages, and the germination rate of the ruptured seeds is shown in Table 1, data analysis was carried out by matched-sample T test. The results indicate that P values of the germination rate and mold rate are both 0.000<0.01. Therefore, the *T. chinense* Turcz. seeds developed to the three-slit stage can effectively enhance the germination rate, and reduces the mold rate.

TABLE 1

| Stage | Germination rate (%) | Mold rate (%) | Non-germinating rate (%) |
|---|---|---|---|
| Single-slit stage | 40.92 ± 14.76 | 49.66 ± 16.70 | 1.87 ± 4.11 |
| three-slit stage | 97.50 ± 2.32 | 2.00 ± 2.13 | 0.50 ± 0.93 |

The above are merely optional embodiments of the present application, and are not intended to limit the present application. Various modifications and variations of this application can be made for those skilled in the art. Any modification, equivalent replacement, improvement, etc. made within the spirit and principle of this application shall be included within the scope of the claims of this application.

What is claimed is:

1. A method for breaking dormancy of *Thesium chinense* Turcz seeds, comprising:
    immersing collected seeds of *Thesium chinense* Turcz in water, selecting seeds that sink in the water followed by air-drying, and storing at 2° C. to 4° C. to obtain to-be-used seeds;
    immersing the to-be-used seeds in a gibberellin solution, taking out the seeds and mixing with river sand under −4° C. to −2° C. for a first stratification treatment;
    rinsing off the river sand, removing green skins and stalks of the seeds after the first stratification treatment, keeping the seeds moist and placing the seeds under 2° C. to 4° C. for a second stratification treatment to obtain ruptured seeds; and
    using the ruptured seeds in a three-slit stage as a germination material, and culturing the ruptured seeds in a three-slit stage in a dark environment at 17° C. to 22° C. for seed germination.

2. The method for breaking dormancy of *Thesium chinense* Turcz seeds as claimed in claim 1, wherein the collected seeds are immersed in the water for 10-14 hours.

3. The method for breaking dormancy of *Thesium chinense* Turcz seeds as claimed in claim 2, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

4. The method for breaking dormancy of *Thesium chinense* Turcz seeds as claimed in claim 1, further comprising, stirring, during water immersion, for 4-6 times.

5. The method for breaking dormancy of *Thesium chinense* Turcz seeds as claimed in claim 4, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

6. The method for breaking dormancy of *Thesium chinense* Turcz seeds as claimed in claim 1, wherein a concentration of the gibberellin solution is 750-1000 mgL$^{-1}$.

7. The method for breaking dormancy of *Thesium chinense* Turcz seeds as claimed in claim 6, wherein the gibberellin is GA$_3$.

8. The method for breaking dormancy of *Thesium chinense* Turcz seeds as claimed in claim 7, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

9. The method for breaking dormancy of *Thesium chinense* Turcz seeds as claimed in claim 6, wherein the to-be-used seeds are immersed in the gibberellin solution for 22-26 hours.

10. The method for breaking dormancy of *Thesium chinense* Turcz seeds as claimed in claim 9, wherein, the to-be-used seeds are immersed in the gibberellin solution for 24 hours.

11. The method for breaking dormancy of *Thesium chinense* Turcz seeds as claimed in claim 10, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

12. The method for breaking dormancy of *Thesium chinense* Turcz seeds as claimed in claim 9, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

13. The method for breaking dormancy of *Thesium chinense* Turcz seeds as claimed in claim 6, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

14. The method for breaking dormancy of *Thesium chinense* Turcz seeds as claimed in claim 1, wherein in the step of mixing with river sand under −4° C. to −2° C. for a first stratification treatment, a mass ratio of the seeds to the river sand is 1:1, and a duration of the first stratification treatment is 58-62 days.

15. The method for breaking dormancy of *Thesium chinense* Turcz seeds as claimed in claim 14, wherein a water content of the river sand is such that the river sand forms a cluster under pressure and scatters when no force being applied.

16. The method for breaking dormancy of *Thesium chinense* Turcz seeds as claimed in claim 15, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

17. The method for breaking dormancy of *Thesium chinense* Turcz seeds as claimed in claim 14, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

18. The method for breaking dormancy of *Thesium chinense* Turcz seeds as claimed in claim 1, wherein in the step of placing the seeds under 2° C. to 4° C. for a second stratification treatment to obtain ruptured seeds, the ruptured seeds are rinsed with water every 6-8 days throughout the second stratification treatment of a total duration of 115-125 days.

19. The method for breaking dormancy of *Thesium chinense* Turcz seeds as claimed in claim 18, wherein in the step of placing the seeds under 2° C. to 4° C. for a second stratification treatment to obtain ruptured seeds, the ruptured seeds are rinsed with water every 7 days throughout the second stratification treatment of the total duration of 120 days.

20. The method for breaking dormancy of *Thesium chinense* Turcz seeds as claimed in claim 1, wherein the step of keeping the seeds moist comprises placing the seeds on a mesh after removing the green skins and the stalks, and covering with a plastic film to keep the seeds moist.

* * * * *